(12) United States Patent
Merz

(10) Patent No.: US 6,179,157 B1
(45) Date of Patent: Jan. 30, 2001

(54) CONTAINER

(75) Inventor: Johann Merz, Schwäbisch-Gmünd (DE)

(73) Assignee: ZF Friedrichshafen AG, Friedrichshafen (DE)

(*) Notice: Under 35 U.S.C. 154(b), the term of this patent shall be extended for 0 days.

(21) Appl. No.: 09/319,705

(22) PCT Filed: Dec. 6, 1997

(86) PCT No.: PCT/EP97/06828

§ 371 Date: Jun. 10, 1999

§ 102(e) Date: Jun. 10, 1999

(87) PCT Pub. No.: WO98/25756

PCT Pub. Date: Jun. 18, 1998

(30) Foreign Application Priority Data

Dec. 11, 1996 (DE) .............................................. 196 51 387

(51) Int. Cl.⁷ ...................................................... B65D 6/00
(52) U.S. Cl. ................................................................ 220/613
(58) Field of Search ................................... 220/612, 613, 220/678, 679

(56) References Cited

U.S. PATENT DOCUMENTS

| | | | |
|---|---|---|---|
| 2,744,655 | * 5/1956 | Ynuk | 220/613 |
| 5,137,166 | * 8/1992 | Unger et al. | 220/613 |
| 5,199,593 | * 4/1993 | Kita | 220/613 |
| 5,215,207 | * 6/1993 | Stolzman | 220/613 |
| 5,697,514 | * 12/1997 | Hekal | 220/613 |
| 5,713,484 | * 2/1998 | Setty | 220/613 |

FOREIGN PATENT DOCUMENTS

| | | |
|---|---|---|
| 7535423 | 3/1976 | (DE) . |
| 27 42 610 | 9/1982 | (DE) . |
| 31 41 728 | 7/1986 | (DE) . |

* cited by examiner

*Primary Examiner*—Joseph M. Moy
(74) *Attorney, Agent, or Firm*—Larson & Taylor PLC

(57) ABSTRACT

A container for a hydraulic medium made of a plastic material has a container cup (1), which can be closed by a cover (2). The positions of the container cup (1) and the cover (2) in respect to each other are matched along a joint (7), and are fixed in place by a fitting insert (8). Faces (10, 11), which adjoin each other, are respectively arranged on the container cup (1) and the cover (2). A welding plate (12), which is also made of a plastic material, extends over the adjoining surfaces of the container cup (1) and the cover (2), and is matched to the adjoining faces (10, 11). The container cup (1) and the cover (2) are sealingly connected with each other via the welding plate (12) by an inertia welding process so as to prevent particles of the plastic material, which are generated in the form of lateral welding waste in the course of the inertia welding process, to reach the interior of the container for the hydraulic medium.

13 Claims, 2 Drawing Sheets

CONTAINER

FIELD OF THE INVENTION

The invention relates to a container, in particular a container for a hydraulic medium, made of a plastic material, having a container cup which can be closed by a cover. The container has a container cup, which can be closed by a cover. The cover and the container cup are fixed in their position in respect to each other.

BACKGROUND OF THE INVENTION

Such containers are used a containers for hydraulic media, for example with hydraulic steering systems. Here, they are used as reservoirs and compensation tanks for hydraulic media being conveyed by a servo pump to the steering system and being returned from there into the hydraulic medium container.

The cover can be connected with the container cup by different means. In connection with an oil container in accordance with DE-C2-31 41 728, the cover is held by means of a screw cap on a screw fastened to the container cup.

In another oil container in accordance with DE-C2-27 42 610, the cover has been directly screwed to the container cup.

At a more recent time it was proposed to connect the cover of a container for a hydraulic medium, wherein the cover can be bonded to the container cup, by bonding the cover with the container cup by means of an inertia welding process. However, in the course of applying this method it was found that, when containers for hydraulic media made of a plastic material are inertia-welded, it is possible that undesired particles of the plastic material, the so-called "lateral welding waste", are created on both sides of the weld seam, which can contaminate the container on the inside and the outside.

A holder or container made of a plastic material is known from NL-A-7 011 090, wherein two elements, which are to be connected, do not move in respect to each other, while a third, ring-shaped element rotates in relation to the two said elements and constitutes a connecting point with the two elements. By means of the method described in the document for connecting two elements which are cylindrical and/or circular in cross section while employing an inertia welding process, it is not possible to connect elements which do not have a dynamically balanced cross section.

BRIEF SUMMARY OF THE INVENTION

Therefore the object of the invention is based on improving a container of the known type in such a way that an inertia welding process can be employed also with containers, which are not dynamically balanced, and that no particles of a plastic material reach the interior of the container, even if the inertia welding method is employed.

This object is attained by the container of the present invention. For this purpose, the container cup and the cover each have a face, which are designed as plane faces and which adjoin each other. A welding plate made of a plastic material extends over these adjoining faces and is matched to the adjoining faces. If the welding plate is now given an oscillating movement in respect to the two parts, cover and container cup, which are fixed in their position in relation to each other, the container cup and the cover are sealingly connected with each other via the welding plate. Lateral welding waste being created because of the employment of the inertial welding process can only exit toward the exterior, but cannot reach the interior of the container.

Useful and advantageous embodiments of the invention are recited hereinafter. When the two adjoining faces of the container cup and the cover are designed as plane faces, located in one plane, the welding plate can also have a plane shape, which is easy to produce. If the cover and the container cup are matched in their position in relation to each other along a joint and are fixed in place by a fitting insert with a shoulder, an entry of the lateral welding waste into the interior of the container is prevented in a particularly dependable manner.

The welding plate has a projection in the area of the joint, at least in its initial state, for a more accurate definition of the position of the welding zone. The material needed for inertia welding is taken from this projection. So that lateral welding waste cannot escape toward the exterior, the welding plate can have a groove outside of the welding zone for receiving the lateral welding waste.

BRIEF DESCRIPTION OF THE DRAWINGS

The invention will be explained in greater detail in what follows by means of an exemplary embodiment represented in the drawings.

Shown are.

DETAILED DESCRIPTION OF THE INVENTION

Figure 1:
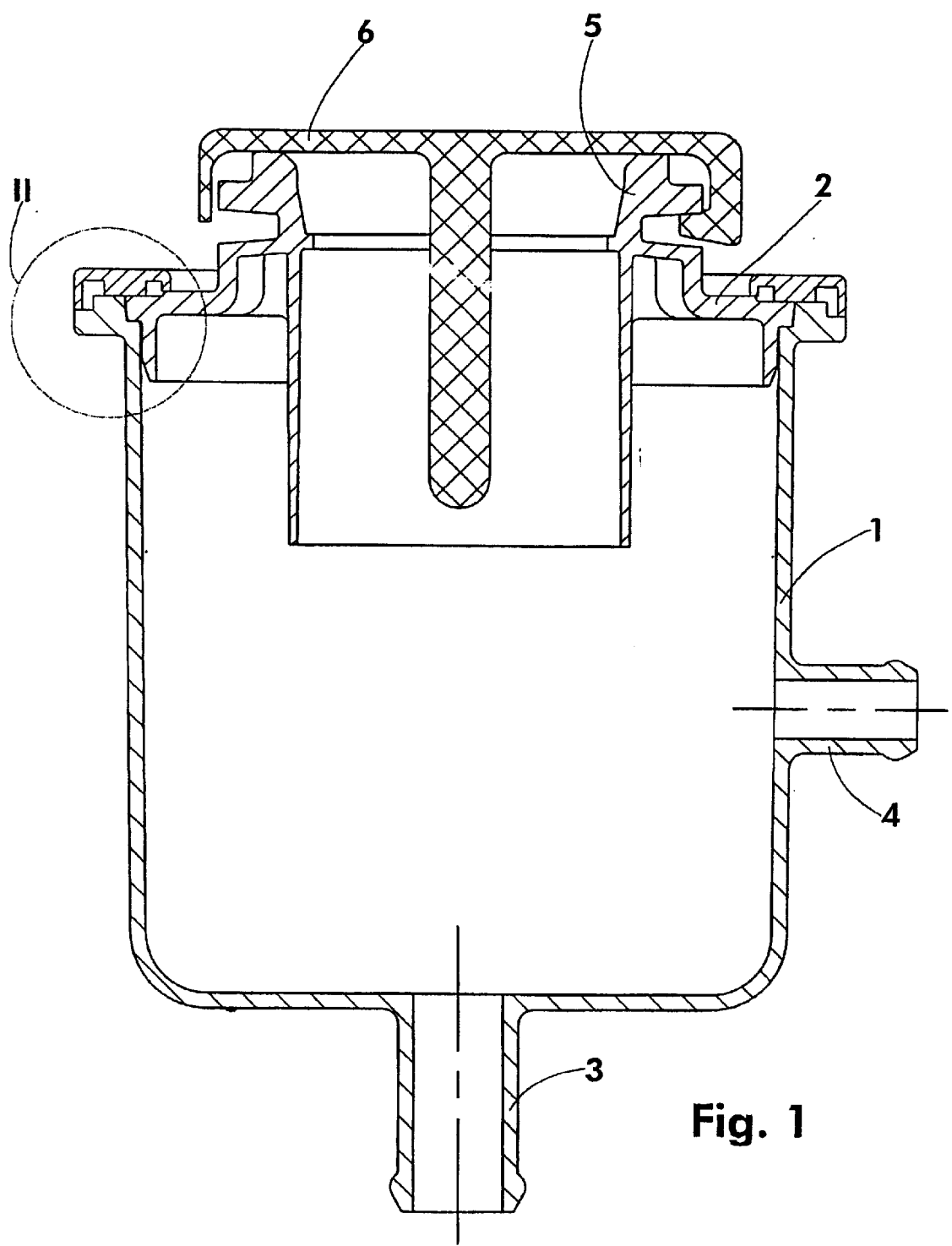
FIG. 1, a longitudinal section through the container in accordance with the invention, and FIG. 2, a partial section of the area II in FIG. 1 on an enlarged scale.

The container has a container cup 1 closed by a cover 2. The container cup 1 has a feed-in port 3 and a return flow port 4, which are connected with a servo pump, not represented. There is normally a filter insert between the two ports 3 and 4 which, however, is not represented, because it is not a part of the invention.

The cover 2 has a filler neck 5, which can be closed by means of a sealing cover 6.

The container cup 1 and the cover 2 touch along a joint 7. Both parts are matched to each other along this joint 7. A fitting insert 8 is created by means of this, which fixes the container cup 1 and the cover 2 in their position in relation to each other. The fitting insert 8 has a shoulder 9.

A face 10, or respectively 11, which adjoin each other, is respectively arranged on the container cup 1 and the cover 2. In the exemplary embodiment, these two faces 10 and 11 are designed as plane faces located in one plane.

A welding plate 12 extends over the adjoining faces 10 and 11 of the container cup 1 and the cover 2. On its face 13, which faces the container cup 1 and the cover 2, the welding plate 12 is matched to the two faces 10 and 11. This is possible in a particularly simple manner if the two faces 10 and 11 are designed as plane faces located in one plane, as represented in the exemplary embodiment. However, the two adjoining faces 10 and 11 do not necessarily have to be designed as plane faces. Faces which are placed at an angle in respect to each other are also conceivable, for example frustrum faces. But it is essential that the face 13 of the welding plate 12 is matched to the faces 10 and 11.

The welding plate 12 is sealing connected with the container cup 1 and the cover 2 by means of an inertia welding process in that the welding plate 12 is given an oscillating movement in relation to the container cup 1 and the cover 2. The container cup 1, the cover 2 and the welding plate 12 are made of a plastic material.

Figure 2:
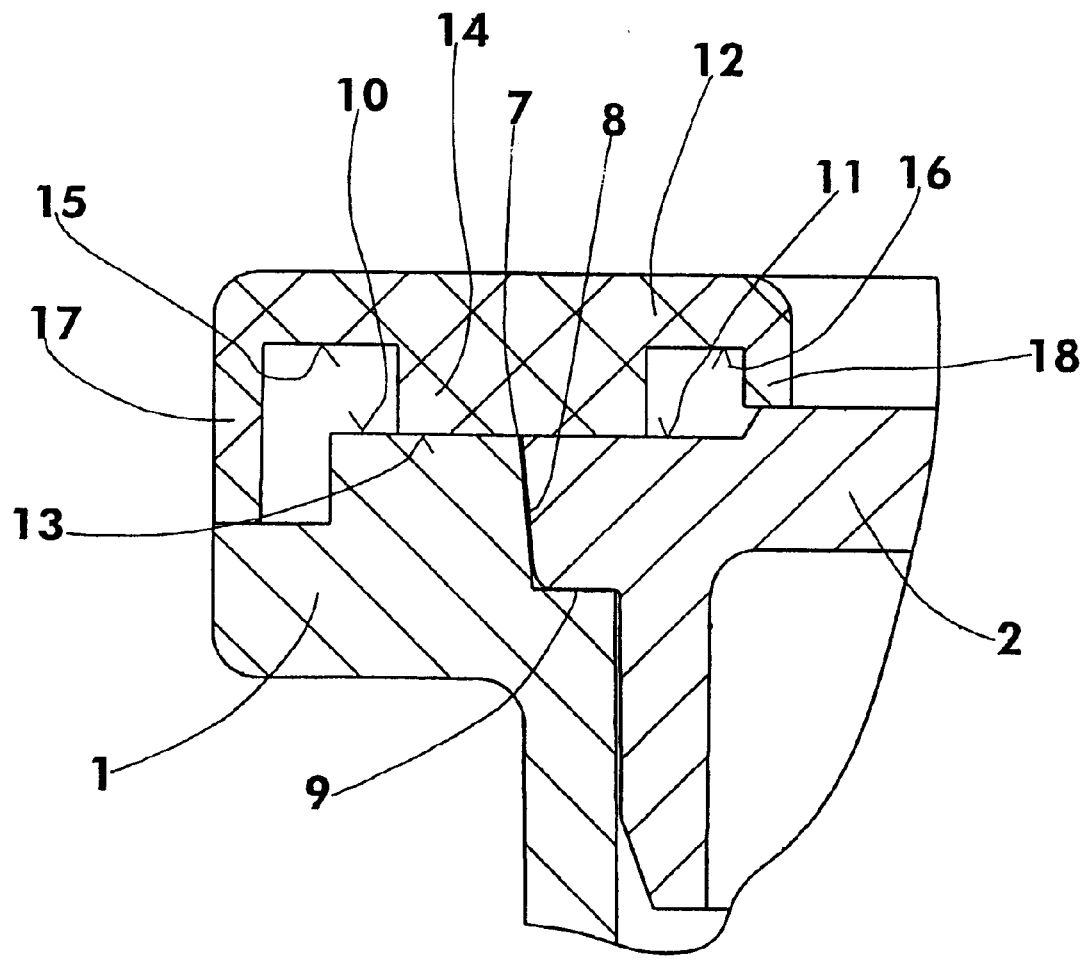

It can be seen in FIG. 2 in particular that particles of the plastic material, which are created in the course of the inertia welding process in the form of lateral welding waste, cannot reach the interior of the container cup 1 because of the narrow joint 7 and the shoulder 9.

The face 13 constitutes the end of a projection 14, which is formed on the welding plate 12 and projects in the direction toward the container cup 1 and the cover 2. The projection 14 provides the material required for welding.

In the exemplary embodiment, the welding plate 12 is limited to a relatively small area on both sides of the joint 7. To prevent the lateral welding waste, which can emerge on both sides of the face 13, from contaminating the exterior of the container for a hydraulic medium, grooves 15 and 16 are provided on both sides of the projection 14. The grooves 15 and 16 are closed toward the exterior by walls 17, or respectively 18 which, at the termination of the inertia welding process, rest against the container cup 1, or respectively against the cover 2. The grooves can also be correspondingly arranged to the same effect in the two faces 10 and 11.

The cross section of the container for a hydraulic medium is not essential for the embodiment of the invention. Depending on the installation options provided, it can be useful to select a rectangular cross section with plane walls, or a circular cross section.

What is claimed is:

1. A container comprising:
   a container cup made of a plastic material and having a first plane face;
   a cover made of a plastic material which closes said container cup and which is fixed in position with respect to said cup, said cover including a second plane face which adjoins said first plane face of said cup;
   a welding plate made of a plastic material which extends over the adjoining said first and second plane faces, said welding plate including respective first and second surfaces opposedly engaged with said first and second plane faces respectively such that said cup and said cover are sealingly connected with each other via said welding plate by an inertial welding of the respective said first and second surfaces of said welding plate and the respective said first and second faces along a welding zone when said welding plate is brought into an oscillating movement in relation to both said cup and said cover.

2. A container as claimed in claim 1 wherein said first plane face and said second plane face, and hence said first and second surfaces engaged therewith, are located in a single plane.

3. A container as claimed in claim 2:
   wherein said first and second plane faces adjoin along a joint, and
   further including a fitting insert between said cup and cover beginning at said joint by which said cover is fixed to said cup, said fitting insert including a shoulder.

4. A container as claimed in claim 3 wherein, prior to inertial welding, said welding plate includes a base and a projection from said base which forms said first and second surfaces.

5. A container as claimed in claim 4 wherein said welding plate further includes a groove on either side of said projection outside of the welding zone in which lateral welding waste created during inertial welding is received.

6. A container as claimed in claim 5:
   wherein said cup includes a first groove adjacent said first plane face and outside of the welding zone; and
   wherein said cover includes a second groove adjacent said second plane face and outside of the welding zone.

7. A container as claimed in claim 4:
   wherein said cup includes a first groove adjacent said first plane face and outside of the welding zone; and
   wherein said cover includes a second groove adjacent said second plane face and outside of the welding zone.

8. A container as claimed in claim 1:
   wherein said first and second plane faces adjoin along a joint, and
   further including a fitting insert between said cup and cover beginning at said joint by which said cover is fixed to said cup, said fitting insert including a shoulder.

9. A container as claimed in claim 1 wherein, prior to inertial welding, said welding plate includes a base and a projection from said base which forms said first and second surfaces.

10. A container as claimed in claim 9 wherein said welding plate further includes a groove on either side of said projection outside of the welding zone in which lateral welding waste created during inertial welding is received.

11. A container as claimed in claim 10:
    wherein said cup includes a first groove adjacent said first plane face and outside of the welding zone; and
    wherein said cover includes a second groove adjacent said second plane face and outside of the welding zone.

12. A container as claimed in claim 9:
    wherein said cup includes a first groove adjacent said first plane face and outside of the welding zone; and
    wherein said cover includes a second groove adjacent said second plane face and outside of the welding zone.

13. A container as claimed in claim 5:
    wherein said first plane face, said second plane face and said first and second surfaces are dynamically balanced;
    wherein said fitting insert has an offset diameter; and
    wherein said projection and said grooves on either side of said projection are of circular shape.

* * * * *